UNITED STATES PATENT OFFICE.

OSCAR H. COUMBE, OF WASHINGTON, D. C., AND ROBERT R. ROBERTS, OF NEW ORLEANS, LOUISIANA, ASSIGNORS, BY DIRECT AND MESNE ASSIGNMENTS, OF ONE-HALF TO M. J. WINE, OF WASHINGTON, D. C.

SUBSTITUTE FOR LARD.

SPECIFICATION forming part of Letters Patent No. 266,778, dated October 31, 1882.

Application filed May 13, 1882. (No specimens.)

*To all whom it may concern:*

Be it known that we, OSCAR H. COUMBE, of Washington city, in the District of Columbia, and ROBERT R. ROBERTS, of New Orleans, Louisiana, have invented a new and useful article of manufacture, which we have named "Oleard," of which the following is a clear, full, and exact description.

We take, say, about seventy parts of cotton-seed or any suitable vegetable oil, prepared by emulsifying with about ten parts of wheaten or other wholesome farinaceous flour, the latter being first thoroughly cooked with about sixteen parts of water and four parts of salt. If any watery substance should remain after emulsion, it must be separated by freezing, as in an ordinary ice-cooler or in any convenient manner, and the oleard is then canned and ready for the market, and is a cheap and delicious substitute for lard.

We are aware that a substitute for lard has been made by mixing flour and oil and agitating the mixture by cold air until amalgamation takes place, and then adding animal fats in a boiling condition, and again agitating by blowing cold air through it until the compound solidifies; but such is not our invention, nor do we claim combining animal fats and vegetable oils for culinary purposes.

Having thus described our invention, what we claim as new, and desire to secure by Letters Patent, is—

As a new article of manufacture, oleard, consisting of vegetable oil, in combination with cooked farinaceous flour, substantially as and in the proportions herein set forth.

OSCAR H. COUMBE.
ROBERT R. ROBERTS.

Witnesses:
H. B. APPLEWHAITE,
E. J. REDMOND.